United States Patent
Aljomard et al.

(10) Patent No.: US 12,391,556 B1
(45) Date of Patent: Aug. 19, 2025

(54) CARBON DIOXIDE CAPTURE USING ACTIVATED CARBON DERIVED FROM SPENT COFFEE GROUNDS

(71) Applicant: UNIVERSITY OF SHARJAH, Sharjah (AE)

(72) Inventors: Haif Aljomard, Sharjah (AE); Abrar Inayat, Sharjah (AE); Rafik Kalfat, Sharjah (AE); Chaouki Ghenai, Sharjah (AE)

(73) Assignee: UNIVERSITY OF SHARJAH, Sharjah (AE)

( * ) Notice: Subject to any disclaimer, the term of this patent is extended or adjusted under 35 U.S.C. 154(b) by 0 days.

(21) Appl. No.: 19/079,043

(22) Filed: Mar. 13, 2025

(51) Int. Cl.
| | |
|---|---|
| B01D 53/02 | (2006.01) |
| B01J 20/20 | (2006.01) |
| B01J 20/30 | (2006.01) |
| C01B 32/324 | (2017.01) |
| C01B 32/348 | (2017.01) |

(52) U.S. Cl.
CPC ............ *C01B 32/324* (2017.08); *B01D 53/02* (2013.01); *B01J 20/20* (2013.01); *B01J 20/3078* (2013.01); *C01B 32/348* (2017.08); *B01D 2253/102* (2013.01); *B01D 2257/504* (2013.01)

(58) Field of Classification Search
CPC .... B01D 32/324; B01D 32/348; B01D 53/02; B01D 2253/102; B01D 2257/504; B01J 20/20; B01J 20/3078
See application file for complete search history.

(56) References Cited

U.S. PATENT DOCUMENTS

| | | | | |
|---|---|---|---|---|
| 2003/0041808 | A1* | 3/2003 | Wulforst | A01K 1/0353 119/28.5 |
| 2005/0064020 | A1* | 3/2005 | Schuette | A61L 15/46 424/443 |
| 2006/0102562 | A1* | 5/2006 | Cannon | B01J 20/3255 210/681 |
| 2006/0141256 | A1* | 6/2006 | Ishikawa | F02M 25/0854 428/116 |
| 2012/0289755 | A1* | 11/2012 | Kato | B01J 20/2803 502/182 |
| 2013/0160652 | A1* | 6/2013 | Yuasa | B01J 20/28026 264/165 |
| 2023/0035251 | A1* | 2/2023 | Mennell | C10K 1/04 |
| 2023/0311094 | A1* | 10/2023 | Abdul-Aziz | C10B 53/02 210/694 |
| 2024/0384442 | A1* | 11/2024 | Seong | C01B 32/354 |

* cited by examiner

*Primary Examiner* — Christopher P Jones
(74) *Attorney, Agent, or Firm* — MH2 Technology Law Group, LLP

(57) ABSTRACT

A method of capturing carbon dioxide comprising synthesising activated carbon using spent coffee grounds (SCG), polyethylene terephthalate (PET), and potassium hydroxide (KOH). The mixture is co-pyrolyzed at a temperature of less than 500 degrees Celsius activated at a temperature of less than 700 degrees Celsius. Carbon dioxide is adsorbed onto a surface of the synthesized activated carbon at a rate of greater than 8 mmol/g at 0 degrees Celsius and at 1 bar absolute pressure. There is also provided an activated carbon product, wherein the activated carbon product has a carbon dioxide adsorption rate of greater than 8 mmol/g at 0 degrees Celsius and at 1 bar absolute pressure.

13 Claims, 2 Drawing Sheets

CARBON DIOXIDE CAPTURE USING ACTIVATED CARBON DERIVED FROM SPENT COFFEE GROUNDS

FIELD

The present disclosure relates to carbon dioxide capture using activated carbon derived from spent coffee grounds. More particularly, but not exclusively, the present disclosure relates to a method for high-capacity carbon dioxide capture using activated carbon derived from spent coffee grounds and polyethylene terephthalate (PET) waste via co-pyrolysis.

BACKGROUND

Background description includes information that will be useful in understanding the present invention. It is not an admission that any of the information provided herein is prior art or relevant to the presently claimed invention, or that any publication specifically or implicitly referenced is prior art.

Carbon dioxide ($CO_2$) is one of the major greenhouse gases that contribute to global warming and climate change. The increasing concentration of $CO_2$ in the atmosphere poses a serious threat to the environment and human health. Therefore, there is a need for developing effective and sustainable technologies for capturing and reducing $CO_2$ emissions from various sources, such as fossil fuel combustion, industrial processes, and power generation.

One technology that has been considered for $CO_2$ capture is the use of adsorbents, which are materials that can selectively bind $CO_2$ molecules on their surface. Among various types of adsorbents, activated carbon (AC) can be considered. However, the conventional methods of producing AC often require high temperatures, long reaction times, and expensive raw materials, which limit their economic and environmental feasibility. Additionally, the adsorption rate of AC is not high enough to provide enough benefit.

Therefore, there is a need for more efficient and effective methods of producing AC from low-cost and abundant waste materials, and a need for AC that has a higher adsorption rate of $CO_2$.

SUMMARY

According to a first aspect of the present disclosure, there is provided a method of capturing carbon dioxide. The method comprises synthesising activated carbon. Synthesising activated carbon comprises: mixing a lignocellulosic feed with a plastic feed to create a feedstock, wherein the lignocellulosic feed comprises spent coffee grounds (SCG), and wherein the plastic feed comprises polyethylene terephthalate (PET); mixing the feedstock with an activation agent to form a mixture, wherein the activation agent comprises potassium hydroxide (KOH); co-pyrolyzing the mixture at a temperature of less than 500 degrees Celsius; and activating the mixture at a temperature of less than 700 degrees Celsius. The method comprises adsorbing carbon dioxide onto a surface of the synthesized activated carbon at a rate of greater than 8 mmol/g at 0 degrees Celsius and at 1 bar absolute pressure.

It has been found that making activated carbon with such a process results in significantly higher specific surface area, increased porosity, and the introduction of oxygen functional groups, thereby enhancing the material's $CO_2$ adsorption capacity.

Additionally, by converting SCG and PET, two prevalent forms of waste, into valuable activated carbon, the present disclosure tackles the increasing issue of waste accumulation, particularly in regions with high coffee consumption such as the UAE and GCC. The co-pyrolysis of these two distinct materials, which are both abundantly available but typically problematic in waste streams, exploits synergistic effects that enhance the porosity and the adsorptive properties of the resulting activated carbon.

The lignocellulosic feed may comprise SCG at a mass composition of greater than 95%. The lignocellulosic feed may comprise SCG at a mass composition of greater than 96%. The lignocellulosic feed may comprise SCG at a mass composition of greater than 97%. The lignocellulosic feed may comprise SCG at a mass composition of greater than 98%. The lignocellulosic feed may comprise SCG at a mass composition of greater than 99%. The lignocellulosic feed may be SCG.

The plastic feed may comprise PET at a mass composition of greater than 95%. The plastic feed may comprise PET at a mass composition of greater than 96%. The plastic feed may comprise PET at a mass composition of greater than 97%. The plastic feed may comprise PET at a mass composition of greater than 98%. The plastic feed may comprise PET at a mass composition of greater than 99%. The plastic feed may be PET.

Mixing the lignocellulosic feed with the plastic feed may comprise mixing the lignocellulosic feed with the plastic feed at a ratio of between 1:3 and 3:1.

The ratio may be between 3:7 and 7:3. The ratio may be between 2:3 and 3:2. The ratio may be between 1:3 and 1:4. The ratio may be between 3:1 and 4:1.

The specific blending ratios have been found to result in optimised properties of the resultant activated carbon, for the purposes of $CO_2$ adsorption.

Mixing the feedstock with the activation agent may comprise dry mixing.

Mixing the feedstock with the activation agent may comprise mixing the feedstock with the activation agent at a ratio of between 1:1 and 1:3.

The ratio may be between 2:3 and 2:5.

The co-pyrolyzing may comprise forming biochar.

The activating may comprise activating the biochar, thereby forming activated carbon.

The co-pyrolyzing temperature may be less than 400 degrees Celsius.

The activating temperature may be less than 600 degrees Celsius. The activating temperature may be less than 650 degrees Celsius.

By utilising lower temperatures, enabled by the choice of feedstock and activation agent, a controlled and environmentally friendly activation temperature of 600° C. can be used, with a lower duration time, highlighting the sustainability and efficiency of the approach The synthesized activated carbon may have a carbon dioxide adsorption rate of greater than 10 mmol/g at 0 degrees Celsius and at 1 bar absolute pressure.

It has been found that making activated carbon according to the present disclosure results in much higher $CO_2$ adsorption rates.

According to a second aspect of the present disclosure, there is provided a method of synthesising activated carbon for adsorbing carbon dioxide, comprising: mixing a lignocellulosic feed with a plastic feed to create a feedstock, wherein the lignocellulosic feed comprises spent coffee grounds (SCG), and wherein the plastic feed comprises polyethylene terephthalate (PET); mixing the feedstock with an activation agent to form a mixture, wherein the activation agent comprises potassium hydroxide (KOH);

co-pyrolyzing the mixture at a temperature of less than 500 degrees Celsius; and activating the mixture at a temperature of less than 700 degrees Celsius, thereby forming activated carbon.

There is provided according to a third aspect of the present disclosure, an activated carbon product obtained by the method of second aspect, wherein the activated carbon product has a carbon dioxide adsorption rate of greater than 8 mmol/g at 0 degrees Celsius and at 1 bar absolute pressure.

BRIEF DESCRIPTION OF THE DRAWINGS

The manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the present disclosure may admit to other equally effective embodiments.

The foregoing and other objects, features and advantages of the present invention, as well as the invention itself, will be more fully understood from the following description of preferred embodiments, when read together with the accompanying drawings.

DETAILED DESCRIPTION

The present disclosure relates to the field of carbon dioxide capture using activated carbon derived from spent coffee grounds. More particularly, but not exclusively, the present disclosure relates to a method for high-capacity carbon dioxide capture using activated carbon derived from spent coffee grounds and polyethylene terephthalate (PET) waste via co-pyrolysis The principles of the present invention and their advantages are best understood by referring to FIG. 1 to FIG. 2. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Figure 1:
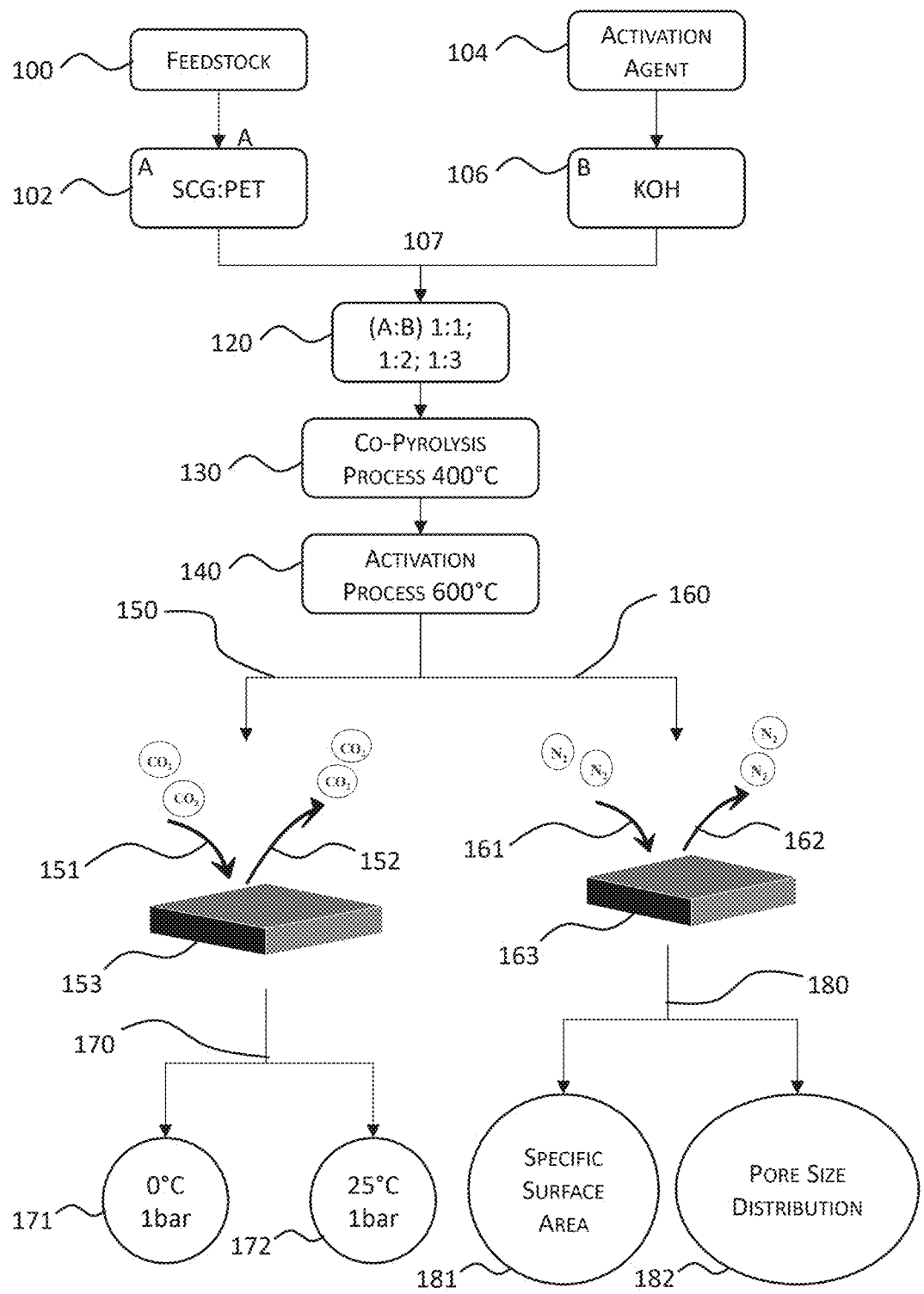
FIG. 1 shows a schematic overview of a method of capturing carbon dioxide according to an embodiment of the present disclosure.

FIG. 1 shows a schematic overview of a method of capturing carbon dioxide according to an embodiment of the present disclosure.

Feedstock 100 comprising spent coffee grounds (SCG) and polyethylene terephthalate (PET) is mixed 102 at a ratio of between 1:3 and 3:1. Activation agent 104 comprising potassium hydroxide 106 is dry mixed 107 with the SCG/PET mixture 102, at a ratio 120 of between 1:3 (SCG/PET: KOH).

The SCG and PET may come from waste streams. By using waste streams for the production process of activated carbon, landfill use can be significantly reduced along with the environmental degradation associated with waste disposal and production of plastic materials. Biochar production can reduce carbon dioxide emissions by using renewable energy technologies to power the reactor. This also contributes to reducing overall carbon footprint.

The use of potassium hydroxide (KOH) in the activation process is tailored specifically to the unique composition of mixed feedstocks. This optimization not only maximizes the development of the internal structure necessary for high CO2 adsorption but also enhances the overall yield and quality of the activated carbon, making it more efficient than those produced through conventional methods. The interaction between the organic and plastic materials with potassium hydroxide (KOH) results in enhanced porosity and specific surface area of the produced activated carbon. This synergistic effect is instrumental in maximizing CO2 adsorption efficiency and improving the overall performance of the resultant material.

The resulting mixture then undergoes co-pyrolysis 130 at a temperature of no greater than 400 degrees Celsius. The mixture is then activated at 600 degrees Celsius.

In embodiments, the co-pyrolysis and the activation happens at the same time.

In embodiments, the activation occurs immediately after the co-pyrolysis (i.e., by increasing the temperature once the co-pyrolysis has been completed.

The synthesis process utilizes a maximum temperature of 600° C., considered environmentally friendly compared to conventional methods that may require higher temperatures or more energy-intensive processes. This highlights the sustainability of the method in transforming waste materials into valuable CO2 adsorbents. In addition, renewable energy system such as solar PV or wind turbine may be used to power the pyrolysis reactor and provide the electrical energy needed for heating the biomass feedstocks and the production of biochar (and subsequently activated carbon).

The CO2 uptake 150 step includes adsorption 151 of the CO2 onto a surface of activated carbon adsorbent 153. Desorption 152 is also shown.

Analysis 170 of the activated carbon was performed to assess the adsorption capacity of the resultant activated carbon at different temperatures. The CO2 adsorption capacities of the activated carbon related to thermostatic bath was performed using a Quanta chrome Instrument Surface area and pore size analyzer (NOVA touch $LX^2$). It was found that at 0 degrees Celsius and ambient pressure (1 bar absolute pressure) 171, the activated carbon had a CO2 adsorption rate of 6.00 mmol/g. It was found that at 25 degrees Celsius and ambient pressure (1 bar absolute pressure) 172, the activated carbon had a CO2 adsorption rate of 10.05 mmol/g.

The textural characterization 160 was also performed on the activated carbon. The textural characterization 160 involved $N_2$ adsorption 161 and desorption 162 on the surface of the activated carbon adsorbent 163 at −196° C. using Quanta chrome Instrument Surface area and pore size analyzer (NOVA touch $LX^2$, USA). The results 180 of the textural characterization 160 show that the interaction between feedstocks and KOH leads to the formation of porous activated carbon, thereby substantially increasing the specific surface area 181 and pore volume 182, thereby enhancing the CO2 adsorption capacity.

In embodiments, the activated carbon produced is suitable for a range of applications beyond CO2 capture, including air purification, water treatment, building material, and the energy sector. The unique features of the activated carbon make the activated carbon a standout contribution to both the fields of waste management and environmental technology, offering a solution that is not only innovative but also highly relevant to current global challenges in sustainability and climate change mitigation.

Figure 2:
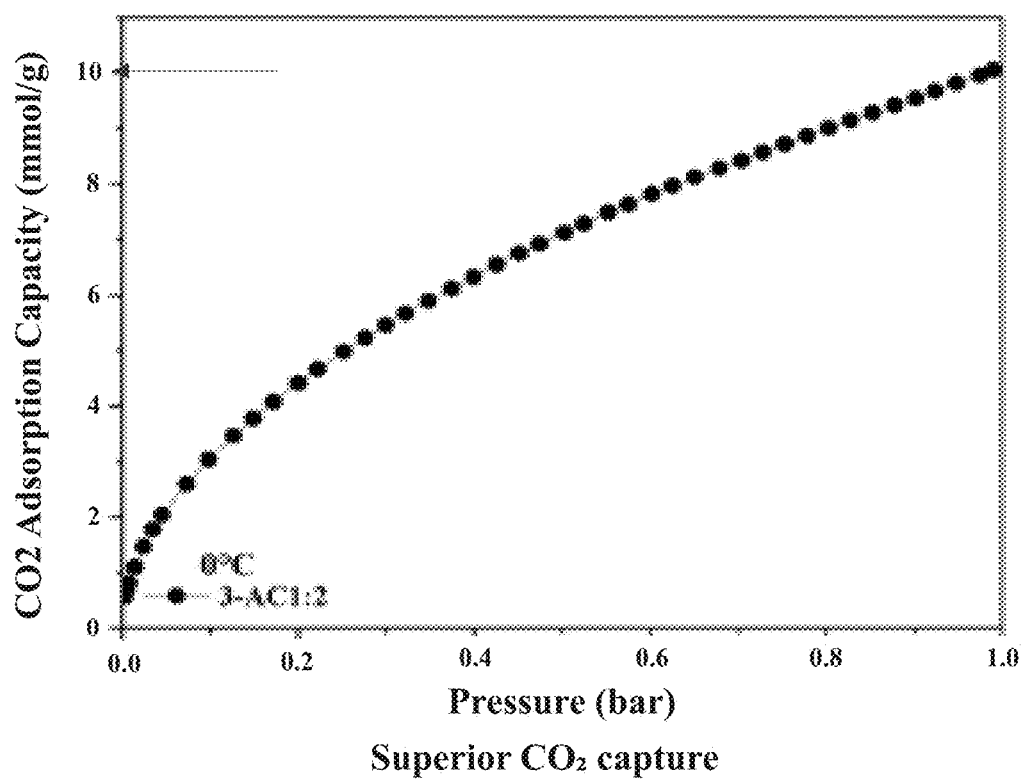
FIG. 2 shows the CO2 adsorption capacity of activated carbon according to an embodiment of the present disclosure.

FIG. 2 shows the CO2 adsorption capacity of activated carbon according to an embodiment of the present disclosure. This shows that at 0 degrees Celsius, the activated carbon according to embodiments of the present disclosure can have a CO2 adsorption capacity of about 10 mmol/g, under ambient pressure.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the present disclosure, defined in scope by the following claims.

Many changes, modifications, variations and other uses and applications of the present disclosure will become apparent to those skilled in the art after considering this specification and the accompanying drawings, which disclose the preferred embodiments thereof. All such changes, modifications, variations and other uses and applications, which do not depart from the spirit and scope of the present disclosure, are deemed to be covered by the invention, which is to be limited only by the claims which follow.

The invention claimed is:

1. A method of capturing carbon dioxide, the method comprising:
    synthesising activated carbon, comprising:
    mixing a lignocellulosic feed with a plastic feed to create a feedstock, wherein the lignocellulosic feed comprises spent coffee grounds (SCG), and wherein the plastic feed comprises polyethylene terephthalate (PET);
    mixing the feedstock with an activation agent to form a mixture, wherein the activation agent comprises potassium hydroxide (KOH);
    co-pyrolyzing the mixture at a temperature of less than 500 degrees Celsius; and
    activating the mixture at a temperature of less than 700 degrees Celsius;
    adsorbing carbon dioxide onto a surface of the synthesized activated carbon at a rate of greater than 8 mmol/g at 0 degrees Celsius and at 1 bar absolute pressure.

2. The method according to claim 1, wherein the lignocellulosic feed comprises SCG at a mass composition of greater than 95%.

3. The method according to claim 1, wherein the plastic feed comprises PET at a mass composition of greater than 95%.

4. The method according to claim 1, wherein mixing the lignocellulosic feed with the plastic feed comprises mixing the lignocellulosic feed with the plastic feed at a ratio of between 1:3 and 3:1.

5. The method according to claim 1, wherein mixing the feedstock with the activation agent comprises dry mixing.

6. The method according to claim 1, wherein mixing the feedstock with the activation agent comprises mixing the feedstock with an activation agent at a ratio of between 1:1 and 1:3.

7. The method according to claim 1, wherein the co-pyrolyzing comprises forming biochar.

8. The method according to claim 7, wherein the activating comprises activating the biochar, thereby forming activated carbon.

9. The method according to claim 1, wherein the co-pyrolyzing temperature is less than 400 degrees Celsius.

10. The method according to claim 1, wherein the activating temperature is less than 600 degrees Celsius.

11. The method according to claim 1, wherein the synthesized activated carbon has a carbon dioxide adsorption rate of greater than 10 mmol/g at 0 degrees Celsius and at 1 bar absolute pressure.

12. A method of synthesising activated carbon for adsorbing carbon dioxide, comprising:
    mixing a lignocellulosic feed with a plastic feed to create a feedstock, wherein the lignocellulosic feed comprises spent coffee grounds (SCG), and wherein the plastic feed comprises polyethylene terephthalate (PET);
    mixing the feedstock with an activation agent to form a mixture, wherein the activation agent comprises potassium hydroxide (KOH);
    co-pyrolyzing the mixture at a temperature of less than 500 degrees Celsius; and
    activating the mixture at a temperature of less than 700 degrees Celsius, thereby forming activated carbon.

13. An activated carbon product obtained by the method of claim 12, wherein the activated carbon product has a carbon dioxide adsorption rate of greater than 8 mmol/g at 0 degrees Celsius and at 1 bar absolute pressure.

* * * * *